United States Patent
Kako et al.

(10) Patent No.: US 7,007,567 B2
(45) Date of Patent: Mar. 7, 2006

(54) SHIFT LEVER APPARATUS AND METHOD OF CONSTRUCTING THEREOF

(75) Inventors: Kenichi Kako, Aichi-ken (JP); Noriyasu Shamoto, Aichi-ken (JP); Haruyuki Kanda, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 287 days.

(21) Appl. No.: 10/428,122

(22) Filed: May 2, 2003

(65) Prior Publication Data
US 2003/0209101 A1 Nov. 13, 2003

(30) Foreign Application Priority Data
May 7, 2002 (JP) .............................. 2002-131716

(51) Int. Cl.
*B60K 20/00* (2006.01)
*F16H 59/00* (2006.01)

(52) U.S. Cl. .................. 74/473.3; 74/473.36; 403/277; 403/330

(58) Field of Classification Search ............... 74/473.3, 74/473.33, 473.34, 473.36; 403/277, 330
See application file for complete search history.

(56) References Cited

U.S. PATENT DOCUMENTS

| 4,579,473 | A | | 4/1986 | Brugger |
| 5,431,266 | A | | 7/1995 | Ito et al. |
| 5,442,975 | A | * | 8/1995 | Osborn .................... 74/473.21 |
| 5,560,253 | A | | 10/1996 | Ishikawa et al. |
| 6,295,886 | B1 | | 10/2001 | Russell |

FOREIGN PATENT DOCUMENTS

| DE | 735 572 | 5/1943 |
| DE | 30 00 759 A1 | 7/1980 |
| DE | 195 39 211 A1 | 4/1997 |
| DE | 101 24 274 A1 | 11/2002 |
| EP | 1 281 878 A1 | 2/2003 |
| FR | 2 444 837 | 7/1980 |
| FR | 2 773 595 | 7/1999 |
| JP | 10-141336 | 5/1998 |

OTHER PUBLICATIONS

European Search Report dated Nov. 26, 2004 in corresponding European Patent Application No. EP 03 00 9626.

* cited by examiner

*Primary Examiner*—William C. Joyce
(74) *Attorney, Agent, or Firm*—Nixon Peabody LLP (57) ABSTRACT

A shift lever apparatus is provided in which, after a slider has been assembled at a case, a link is assembled to the case while an intrusion shaft is inserted into a hole. For assembly of the link to the case, an assembly pawl provided at the link is resiliently deformed and inserted at an assembly portion which is provided at into the case. The assembly pawl includes an engaging protrusion that is engaged with a surrounding area of the assembly portion by resilient force of the assembly pawl. A blocking member is pre-positioned to interfere with the assembly pawl when the engaging protrusion is engaged with the surrounding area to block release of the assembly pawl.

11 Claims, 7 Drawing Sheets

FRONT ← → REAR

FIG. 7
PRIOR ART

SHIFT LEVER APPARATUS AND METHOD OF CONSTRUCTING THEREOF

BACKGROUND OF THE INVENTION

1. Technical Field

The present invention relates to a shift lever apparatus whose shift position is changed by moving of a shift lever.

2. Description of the Related Art

A gate-type shift lever apparatus is equipped with a shift lever. When the shift lever is pivoted in a vehicle front-rear direction, a vehicle left-right direction or the like, a shift position is changed. Shift positions may be, for example, a 'D' shift position, a '4' shift position, a '3' shift position, a '2' shift position and an 'L' shift position.

For example: when a shift lever is to change from a 'D' shift position to a '4' shift position, it is necessary for the shift lever to be pivoted in a vehicle rightward direction; when the shift lever is to change from the '4' shift position to a '3' shift position, it is necessary to pivot the shift lever in a vehicle rearward direction; when the shift lever is to change from the '3' shift position to a '2' shift position, it is necessary to pivot the shift lever in a vehicle leftward direction and the vehicle rearward direction, in that order; and when the shift lever is to change from the '2' shift position to an 'L' shift position, it is necessary to pivot the shift lever in the vehicle leftward direction.

Figure 6:
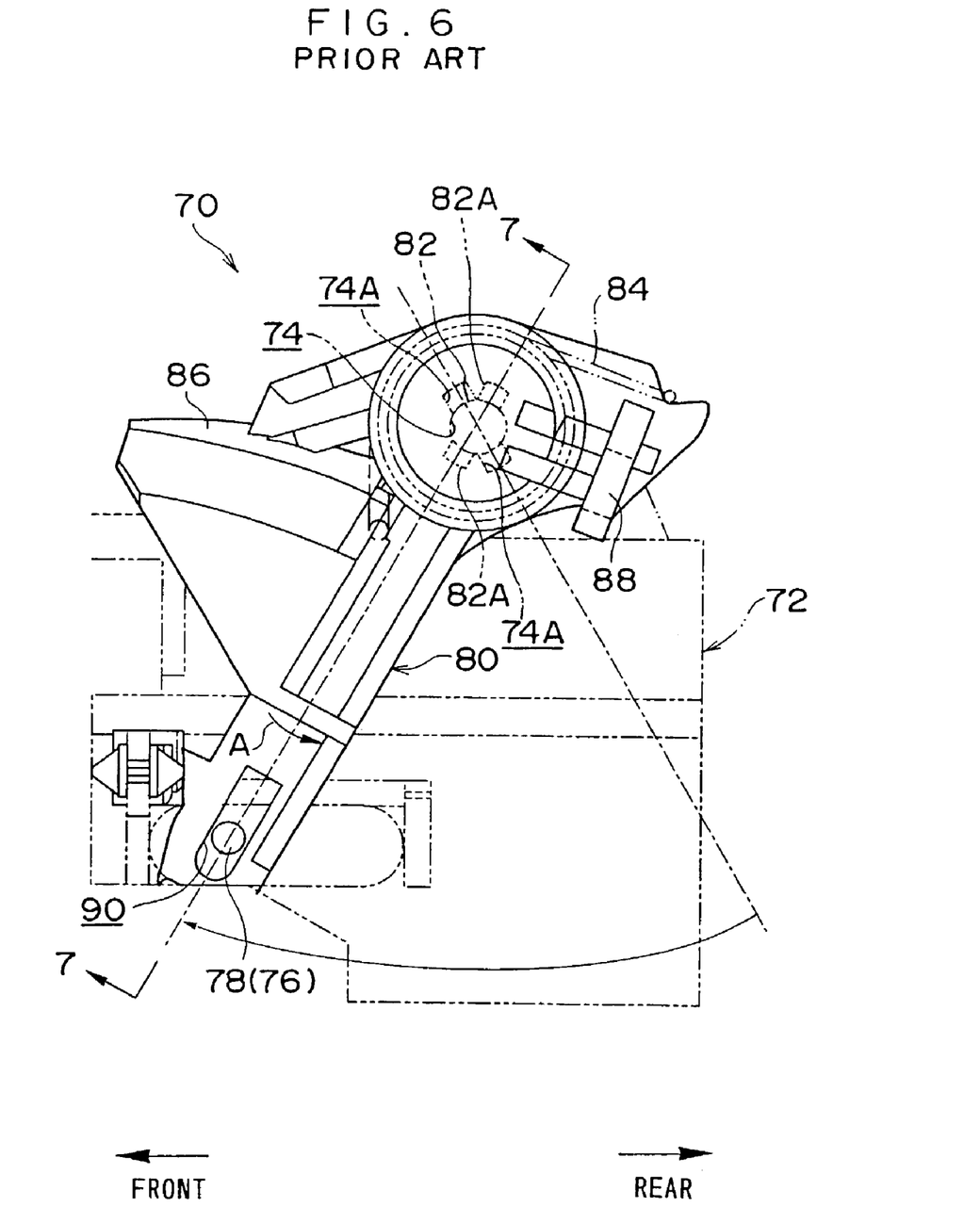
FIG. 6 is a side view showing principal elements of a conventional shift lever apparatus.
Figure 7:
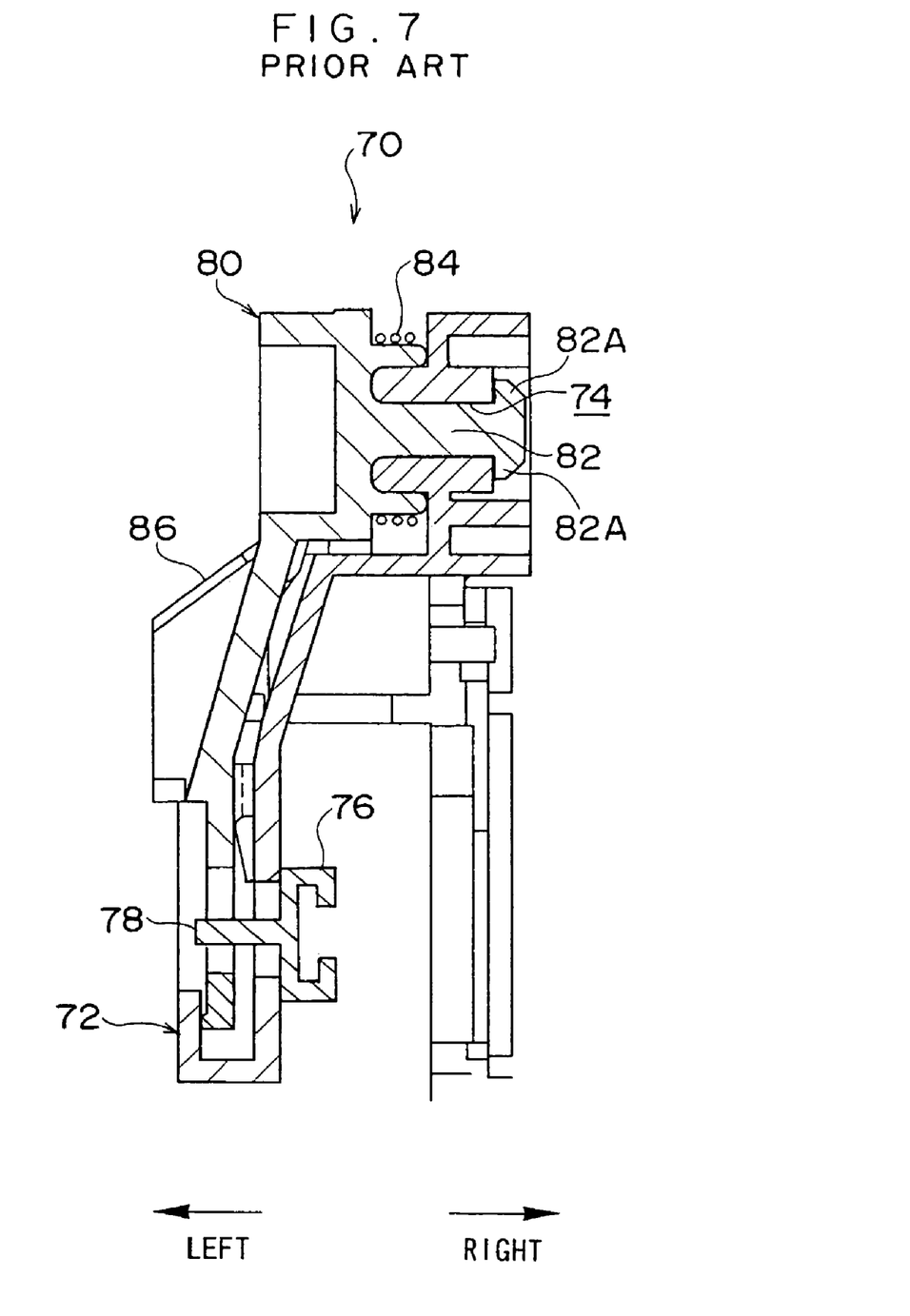
FIG. 7 is a sectional view (showing a section along line 7—7 of FIG. 6) showing principal elements of the conventional shift lever apparatus.

Incidentally, a shift lever apparatus 70 shown in FIGS. 6 and 7, which is currently being developed, is equipped with a case 72. A cylinder-form assembly portion 74 is formed in an upper portion of the case 72. Cuboid-form penetration holes 74A are formed in diagonally upward portions and diagonally downward portions of the assembly portion 74. The penetration holes 74A are formed in square shaft forms and oppose one another.

A slider 76 is provided in the case 72. The slider 76 is slidable in the vehicle front-rear direction. An intruding shaft 78 is integrally provided at the slider 76. The slider 76 protrudes to outside the case 72.

A link 80 is disposed at the vehicle leftward side of the case 72. A cylinder-form assembly shaft 82 is provided at an upper portion of the link 80. A pair of engaging protrusions 82A are provided at a distal end of the assembly shaft 82. The engaging protrusions 82A are formed in cuboid shapes and oppose one another.

The link 80 is rotatably assembled to the case 72 by inserting the engaging protrusions 82A through the penetration holes 74A, thus passing the assembly shaft 82 through and fitting the assembly shaft 82 into the assembly portion 74, and then rotating the link 80 through a predetermined angle in a direction opposite to the direction of arrow A in FIG. 6. In this structure, rotation positions of the engaging protrusions 82A do not coincide with the penetration holes 74A within a range through which the link 80 is rotated by pivoting of the shift lever, which is as described below. As a result, disengagement of the assembly of the link 80 to the case 72 is prevented. In addition, a torsion coil spring 84 bridges across between the case 72 and the link 80, and the link 80 is urged by the torsion coil spring 84 in the direction opposite to the direction of arrow A in FIG. 6.

A first arm 86 is provided at the link 80. The first arm 86 extends in a vehicle forward direction. A second arm 88 is also provided at the link 80. The second arm 88 extends in the vehicle leftward direction. A switching portion is integrally provided at a base end side of the shift lever, in correspondence with the first arm 86 and the second arm 88. The switching portion moves integrally in accordance with the pivoting of the shift lever.

When the shift lever is changed from the 'D' shift position to the '4' shift position, the switching portion moves in accordance with the pivoting of the shift lever. As a result of this movement of the switching portion, the first arm 86 is displaced downward, and the link 80 is rotated in the direction of arrow A in FIG. 6. When the shift lever is changed from the '2' shift position to the 'L' shift position, the switching portion moves in accordance with the pivoting of the shift lever, and as a result the second arm 88 is displaced upward and the link 80 is rotated in the direction of arrow A in FIG. 6.

A long, narrow intrusion hole 90 is formed at a lower portion of the link 80. The intruding shaft 78 of the slider 76 intrudes into the intrusion hole 90 slidably. Consequently, when the link 80 rotates in the direction of arrow A in FIG. 6, the slider 76 slides in the vehicle rearward direction.

In this structure, the shift position of the shift lever is detected by detecting a pivoting position of the shift lever in the front-rear direction and a sliding position of the slider 76.

However, in this shift lever apparatus 70, when the link 80 is assembled to the case 72 as described above, it is necessary to rotate the link 80 in the direction opposite to the direction of arrow A in FIG. 6 after the engaging protrusions 82A have been inserted at the penetration holes 74A and the assembly shaft 82 has been passed through and fitted into the assembly portion 74. Therefore, if the link 80 is assembled to the case 72 after the slider 76 has been assembled in the case 72, the intruding shaft 78 of the slider 76 will abut against the link 80 when the link 80 is being rotated in the direction opposite to the direction of arrow A in FIG. 6. Consequently, the intruding shaft 78 cannot be fitted into the intrusion hole 90 of the link 80.

Therefore, it is necessary to assemble the slider 76 to the case 72 and to construct the case 72 after the link 80 has been assembled to the case 72. Thus, the link 80 cannot be assembled to the case 72 in steps of an assembly process of the shift lever apparatus 70 (a process for assembling the shift lever, the case 72 and the like) that are subsequent to assembly steps of the case 72. As a result, a number of types of a unit of the case 72 and the link 80 in the assembly process of the shift lever apparatus 70 is a number of types of the link 80 multiplied by a number of types of the case 72. Consequently, the number of types of assembly components (units of the case 72 and link 80) is large, and operations for assembly of the shift lever apparatus 70 are made more complicated.

SUMMARY OF THE INVENTION

In consideration of the circumstances described above, an object of the present invention is to provide a shift lever apparatus which can simplify assembly operations.

A shift lever apparatus of the present invention includes: a shift lever, a shift position of which is changed by moving; an assembly member disposed at a vicinity of the shift lever; and a rotating member which is rotatably assembled to the assembly member and which detects the shift position of the shift lever by rotating in accordance with pivoting of the shift lever. This shift lever apparatus further includes an assembly portion provided at one of the assembly member and the rotating member. The shift lever apparatus also includes an assembly pawl which is provided at the other of the assembly member and the rotating member. This assembly pawl includes an engaging protrusion which protrudes to an outer side. The assembly pawl includes resilience. When the assembly pawl is inserted into the assembly portion and is engaged at a surrounding area of the assembly portion, the rotating member is assembled to the assembly member.

In the shift lever apparatus of the present invention, the shift position of the shift lever is detected by the rotating member rotating in accordance with pivoting of the shift lever.

Further, the assembly pawl of the other of the assembly member and the rotating member is resiliently deformed and inserted into the assembly portion of the one of the assembly member and the rotating member, and the engaging protrusion of the assembly pawl is engaged at the surrounding area of the assembly portion by resilient force of the assembly pawl. Hence, the rotating member is assembled to the assembly member.

Consequently, even in the case of a structure in which an intrusion hole is provided in the rotating member (similarly to the prior art), a slider is assembled in the assembly member (similarly to the prior art) and an intruding shaft protrudes from the assembly member (similarly to the prior art) beforehand, the intruding shaft can intrude at the intrusion hole when the rotating member is being assembled to the assembly member.

Accordingly, the rotating member can be assembled to the assembly member after the slider has been assembled to the assembly member and the assembly member has been constructed. Thus, the rotating member can be assembled to the assembly member in steps of an assembly process of the shift lever apparatus (a process for assembling the shift lever, the assembly member and the like) that are subsequent to steps for assembly of the assembly member. As a result, there are only a number of types of the assembly member and a number of types of the rotating member in the assembly process of the shift lever apparatus. Consequently, the number of types of assembly components (the assembly member, the rotating member and the like) can be made smaller, and operations for assembly of the shift lever apparatus can be made simpler.

The shift lever apparatus of the present invention may include a blocking member disposed in correspondence with the assembly pawl. This blocking member blocks release of the engagement of the engaging protrusion at the assembly portion surrounding area by interfering with the assembly pawl when the engaging protrusion has engaged at the surrounding area of the assembly portion.

Further, because, in the shift lever apparatus of the present invention, the blocking member interferes with the assembly portion when the engaging protrusion has been engaged at the surrounding area of the assembly portion and thus release of the engagement of the engaging protrusion with the assembly portion surrounding area can be blocked, disengagement of the assembly of the rotating member to the assembly member can be prevented.

In the shift lever apparatus of the present invention, the blocking member that is utilized may include resilience. Such a blocking member enables engagement of the engaging protrusion at the assembly portion surrounding area by being resiliently deformed by the assembly pawl to a side of the blocking member which is opposite to a side thereof at which the assembly pawl is disposed.

In the shift lever apparatus in a case in which such a blocking member is provided, when the blocking member is resiliently deformed to the side opposite the assembly pawl side by the assembly pawl, the engagement of the engaging protrusion at the assembly portion surrounding area is enabled. As a result, obstruction by the blocking member of the engagement of the engaging protrusion at the assembly portion surrounding area can be prevented. Thus, the engaging protrusion can be easily engaged with the surrounding area of the assembly portion, and the rotating member can be easily assembled to the assembly member.

DETAILED DESCRIPTION OF THE EMBODIMENT

Figure 4:
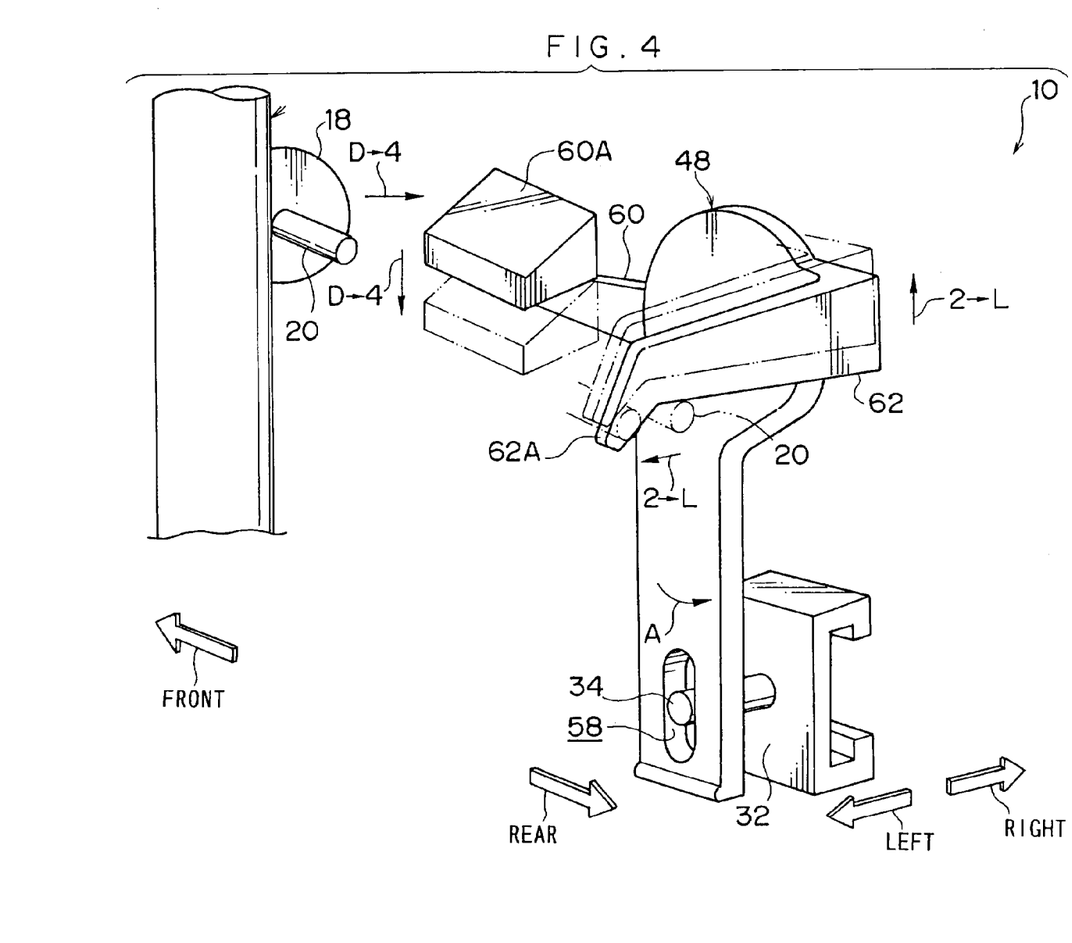
FIG. 4 is a perspective view schematically showing the shift lever apparatus relating to the embodiment of the present invention.

FIG. 4 shows principal elements of a shift lever apparatus 10 relating to an embodiment of the present invention in a perspective view.

The shift lever apparatus 10 relating to the present embodiment is a "gate-type" apparatus, and is disposed at a floor in a vehicle.

The shift lever apparatus 10 is equipped with a shift lever 12. The shift lever 12 is made to be pivotable and movable in a vehicle front-rear direction and a vehicle left-right direction. The vehicle front-rear direction corresponds to a longitudinal direction, and the vehicle left-right direction corresponds to directions towards two sides or a lateral direction.

Figure 5:
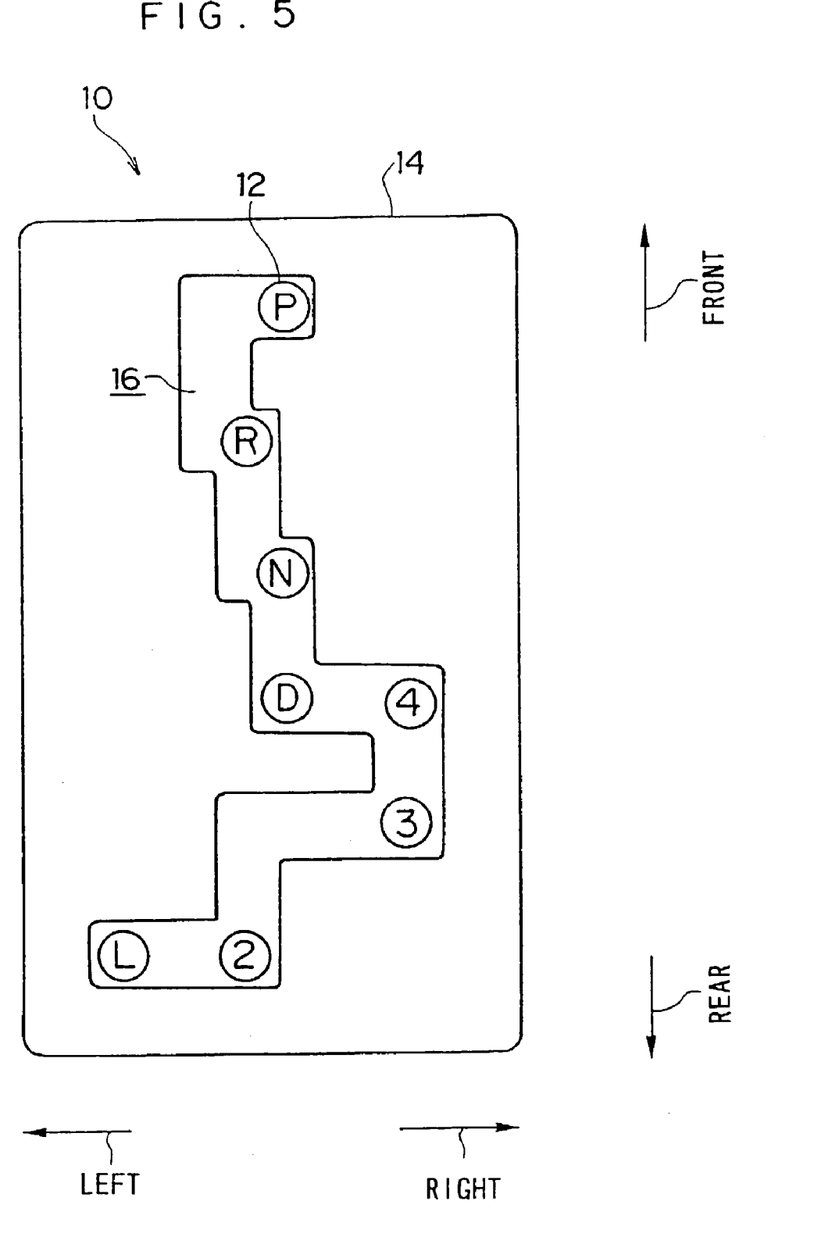
FIG. 5 is a plan view showing a cover of the shift lever apparatus relating to the embodiment of the present invention.

As shown in FIG. 5, the shift lever apparatus 10 is provided with a box-like cover 14. A guide hole 16 is formed in an upper face of the cover 14. The guide hole 16 is made to have a predetermined convoluted form, and the shift lever 12 passes through the guide hole 16. The shift lever 12 is guided by the guide hole 16 and is pivoted in the vehicle front-rear direction and the vehicle left-right direction. Thus, a shift position of the shift lever 12 is changed. In the present embodiment, shift positions are a 'P' shift position, an 'R' shift position, an 'N' shift position, a 'D' shift position (a first shift position), a '4' shift position (a third shift position), a '3' shift position, a '2' shift position (a second shift position) and an 'L' shift position (a fourth shift position).

Specifically, when the shift lever 12 is to change from the 'P' shift position to the 'R' shift position, it is necessary for the shift lever 12 to be pivoted in a vehicle leftward direction, a vehicle rearward direction and a vehicle rightward direction, in that order. When the shift lever 12 is to change from the 'R' shift position to the 'N' shift position, it is necessary for the shift lever 12 to be pivoted in the vehicle rearward direction and the vehicle rightward direction, in that order. When the shift lever 12 is to change from the 'N' shift position to the 'D' shift position, it is necessary for the shift lever 12 to be pivoted in the vehicle rearward direction. When the shift lever 12 is to change from the 'D' shift position to the '4' shift position, it is necessary for the shift lever 12 to be pivoted in the vehicle rightward direction to one side in a predetermined direction. When the shift lever 12 is to change from the '4' shift position to the '3' shift position, it is necessary for the shift lever 12 to be pivoted in the vehicle rearward direction. When the shift lever 12 is to change from the '3' shift position to the '2' shift position, it is necessary for the shift lever 12 to be pivoted in the vehicle leftward direction and the vehicle rearward direction, in that order. When the shift lever 12 is to change from the '2' shift position to the 'L' shift position, it is necessary for the shift lever 12 to be pivoted in the vehicle leftward direction to the other side in the predetermined direction.

Accordingly, pivoting positions of the shift lever 12 in the vehicle front-rear direction differ for the 'P' shift position, the 'R' shift position, the 'N' shift position, the 'D' and '4' shift positions, the '3' shift position, and the '2' and 'L' shift positions.

The pivoting position of the shift lever 12 in the vehicle front-rear direction is detected. Accordingly, it is detected if the shift lever 12 is located at one of the 'P' shift position, the 'R' shift position, the 'N' shift position, the 'D' shift position or '4' shift position, the '3' shift position, and the '2' shift position or 'L' shift position.

As shown in FIG. 4, a semi-circular disc-form switching plate 18 is integrally provided at a base end side of the shift lever 12. The switching plate 18 protrudes from the shift lever 12 in the vehicle rightward direction. A cylinder-form switching shaft 20 is integrally provided at the switching plate 18. The switching shaft 20 protrudes from the switching plate 18 in the vehicle rearward direction.

Figure 1:
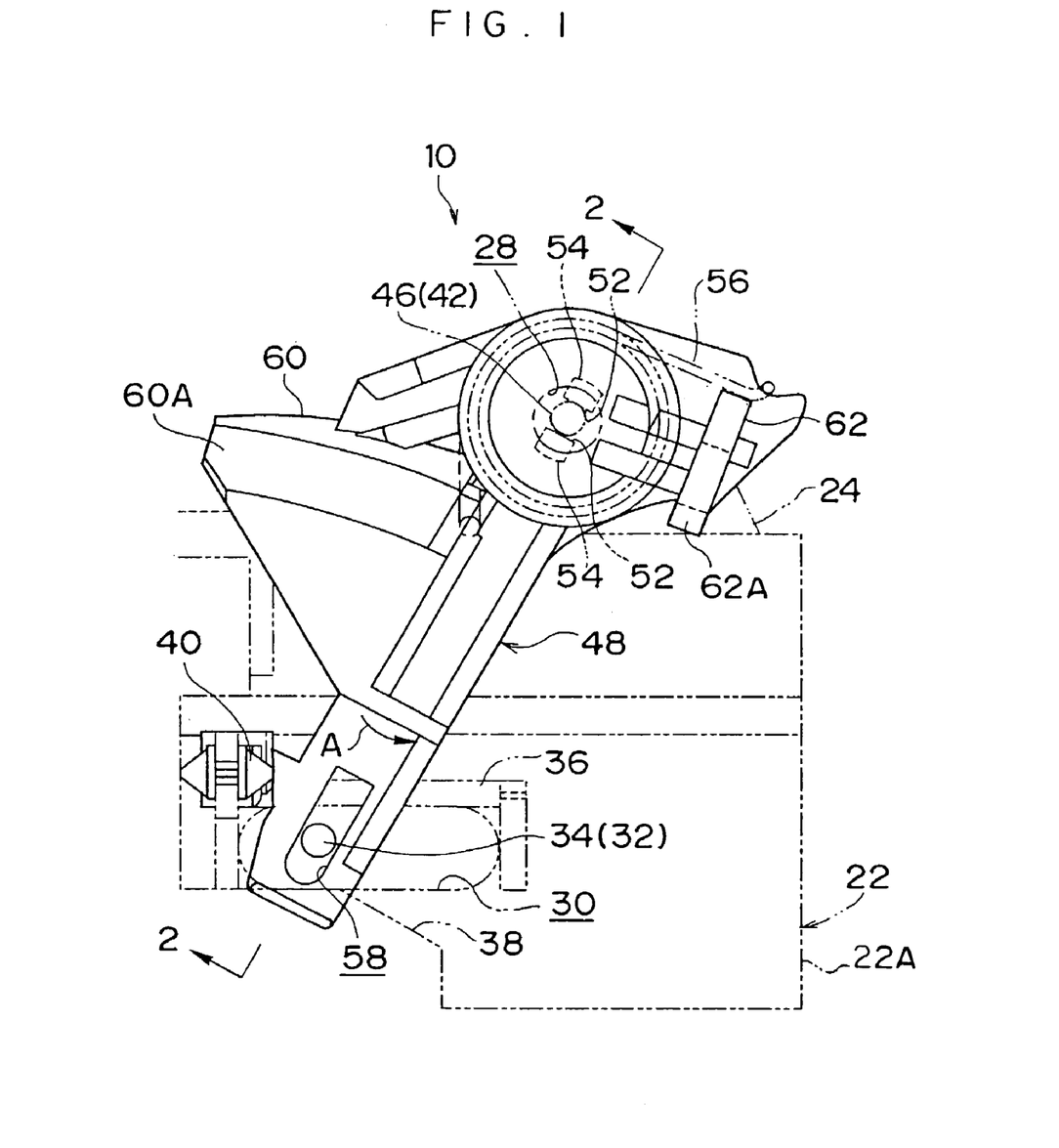
FIG. 1 is a side view showing principal elements of a shift lever apparatus relating to an embodiment of the present invention.
Figure 2:
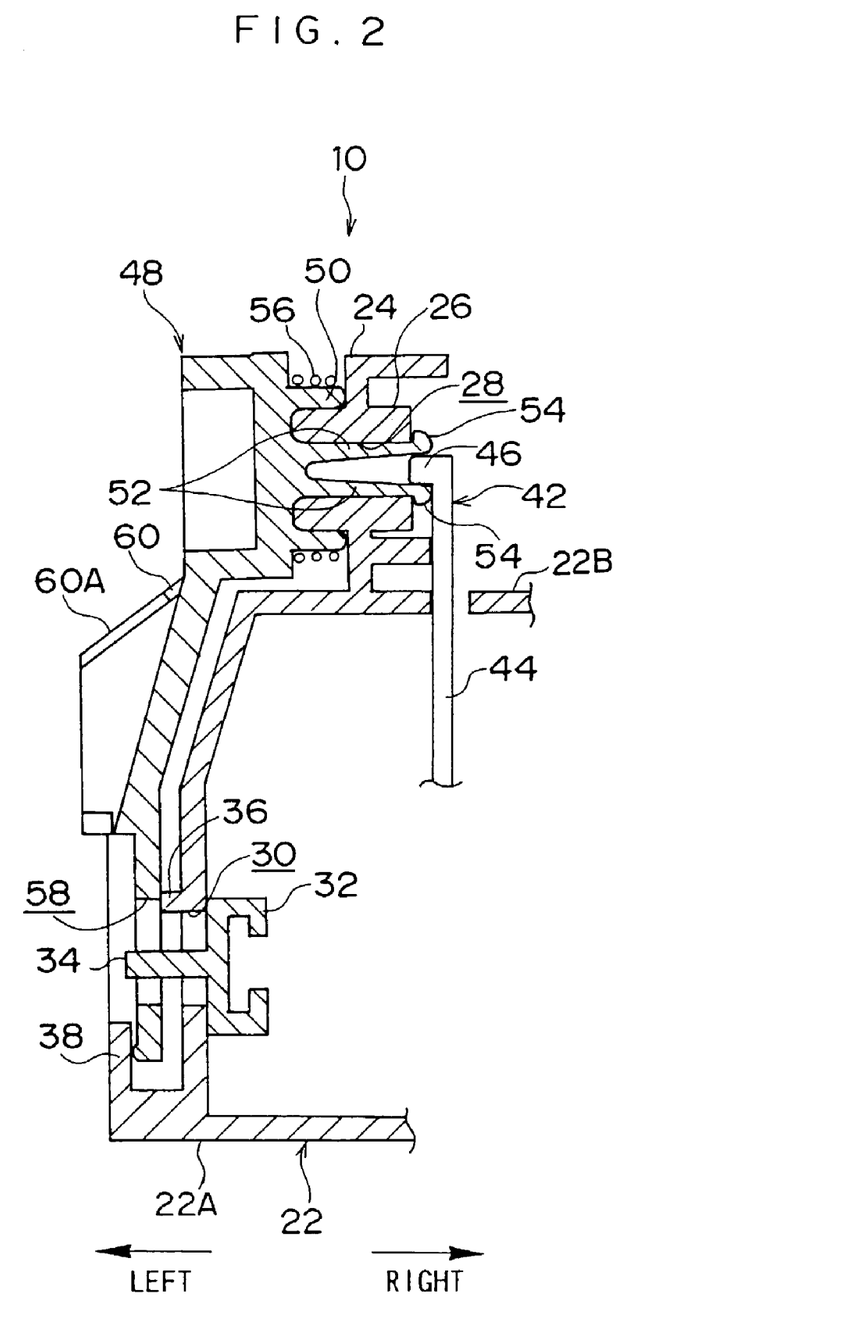
FIG. 2 is a sectional view (showing a section along line 2—2 of FIG. 1) showing principal elements of the shift lever apparatus relating to the embodiment of the present invention.

A case 22, which serves as an assembly member, is provided at the vehicle rightward side of the shift lever 12 (see FIGS. 1 and 2). The case 22 has a substantially cuboid box form. The case 22 is provided with a case portion 22A at the vehicle leftward side and a cover portion 22B at the vehicle rightward side. The case 22 is constructed by assembling the cover portion 22B to the case portion 22A. A triangular plate-form protruding plate 24 is provided standing at an upper face of the case 22 (the case portion 22A). An insertion tube 26 is provided laterally at the protruding plate 24. The insertion tube 26 has a circular barrel form, and an interior thereof is a cylinder-form assembly portion 28. The insertion tube 26 is located, in correspondence with a position of the shift lever 12, between the 'D' shift position and the '2' shift position of the shift lever 12.

An insertion hole 30 is formed at a lower portion of a vehicle left side sidewall of the case 22 (the case portion 22A). The insertion hole 30 is formed to be long in the vehicle front-rear direction. A slider 32 (a PC board) is assembled in the case 22. The slider 32 is provided so as to be slidable in the vehicle front-rear direction. A cylinder-form intruding shaft 34 is integrally provided at a vehicle left side face of the slider 32. The intruding shaft 34 is inserted through the insertion hole 30 and protrudes from the vehicle left side sidewall of the case 22.

A guide protrusion 36 is provided at the vehicle left side sidewall of the case 22, upward of the insertion hole 30. The guide protrusion 36 protrudes in the vehicle leftward direction. Further, a flat plate-form guide wall 38 is provided joined at a lower end of the vehicle left side sidewall of the case 22. The guide wall 38 stands upright. In addition, a resilient member 40, which is made of rubber and has resilience, is removably provided at the vehicle left side sidewall of the case 22, in the vehicle forward direction relative to the guide protrusion 36. The resilient member 40 protrudes in a triangular pyramid shape towards the vehicle rearward direction.

A blocking member 42 is provided at the case 22. The blocking member 42 features a long, flat plate-form support plate 44, which has resilience, and a cylinder-form blocking post 46, which does not have resilience. A lower portion of the support plate 44 is fixed to the cover portion 22B, and is disposed inside the case 22. An upper portion of the support plate 44 protrudes upward from the case 22 at the vehicle rightward side of the protruding plate 24. The blocking post 46 is integrally provided at an upper end of the support plate 44, protrudes in the vehicle leftward direction from the support plate 44, and is disposed on a central axis of the assembly portion 28.

A link 48, which serves as a rotating member, is disposed at the vehicle leftward side of the case 22. The link 48 is formed substantially in a long plate shape. A circular barrel-form fitting tube 50 is integrally provided at an upper portion of the link 48. An outer peripheral face of the aforementioned insertion tube 26 is fitted with an inner peripheral face of the fitting tube 50. A vehicle left side face of the fitting tube 50 abuts against the protruding plate 24, and a side face of the link 48 that is inside the fitting tube 50 abuts against a vehicle left side face of the insertion tube 26.

A pair of assembly pawls 52 are integrally provided at the upper portion of the link 48. The assembly pawls 52 respectively have resilience, and are disposed at a central vicinity of the fitting tube 50 in a state such that the assembly pawls 52 oppose one another and sandwich the center of the fitting tube 50. The assembly pawls 52 are passed through (inserted into) the assembly portion 28. Outer peripheral faces of the assembly pawls 52 are formed in circular periphery surface forms and are fitted with a peripheral face of the assembly portion 28 (an inner peripheral face of the insertion tube 26).

Engagement protrusions 54, which do not have resilience, are integrally provided at distal ends (vehicle right side ends) of the assembly pawls 52. The engagement protrusions 54 protrude to outer sides relative to the insertion tube 26 from the assembly pawls 52. Vehicle left side faces of the engagement protrusions 54 are set to be perpendicular relative to the outer peripheral faces of the assembly pawls 52. When the engagement protrusions 54 are engaged at (abutted against) a surrounding area of the assembly portion 28 (a vehicle right side face of the insertion tube 26), the link 48 is rotatably assembled to the case 22.

The blocking post 46 of the blocking member 42 is inserted between the pair of assembly pawls 52. The blocking post 46 abuts against (interferes with) the assembly pawls 52, and blocks resilient deformation of the assembly pawls 52 to the inner sides thereof. Thus, disengagement of the engagement of the engagement protrusions 54 with the assembly portion 28 surrounding area is blocked. In addition, the support plate 44 of the blocking member 42 abuts against a lower side one of the engagement protrusions 54.

A torsion coil spring 56 is provided at an outer periphery of the fitting tube 50. One end of the torsion coil spring 56 is engaged at the case 22, whereas the other end of the torsion coil spring 56 is engaged at the link 48. Consequently, an urging force in a direction opposite to the direction of arrow A in FIG. 1 is applied to the link 48, and a lower portion of the link 48 abuts against the resilient member 40.

An intrusion hole 58 is formed in the lower portion of the link 48. The intrusion hole 58 is long in a direction of length of the link 48. The intruding shaft 34 of the slider 32 is slidably intruded at the intrusion hole 58. Consequently, when the link 48 is rotated, the intruding shaft 34 moves in the insertion hole 30, in the vehicle front-rear direction. Thus, the slider 32 is set to be movable in the vehicle front-rear direction.

The lower portion of the link 48 abuts against the guide protrusion 36, and a lower end of the link 48 abuts against the guide wall 38. Thus, when the link 48 is rotated, the lower portion of the link 48 slides along the guide protrusion 36, and the lower end of the link 48 slides along the guide wall 38. Thus, looseness of the lower portion of the link 48 in the vehicle left-right direction is prevented, and rotation of the link 48 is guided.

Figure 3A:
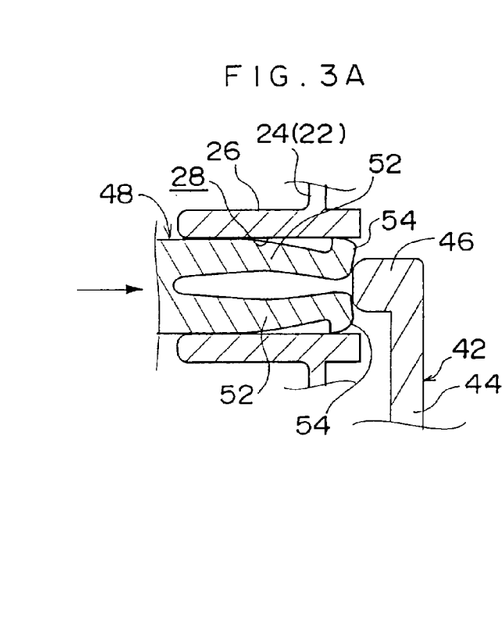
FIGS. 3A to 3C are sectional views showing a process for assembling a link to a case at the shift lever apparatus relating to the embodiment of the present invention.
Figure 3B:
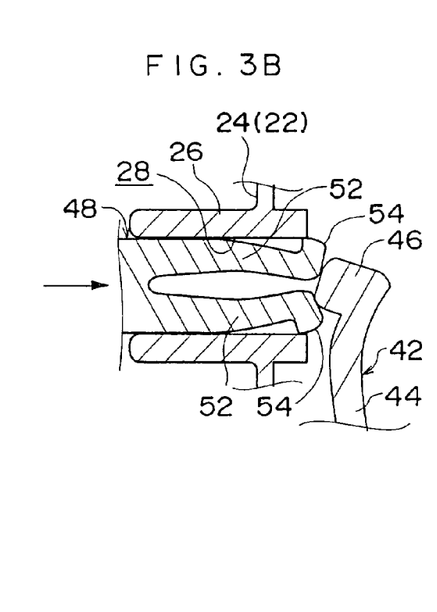
Figure 3C:
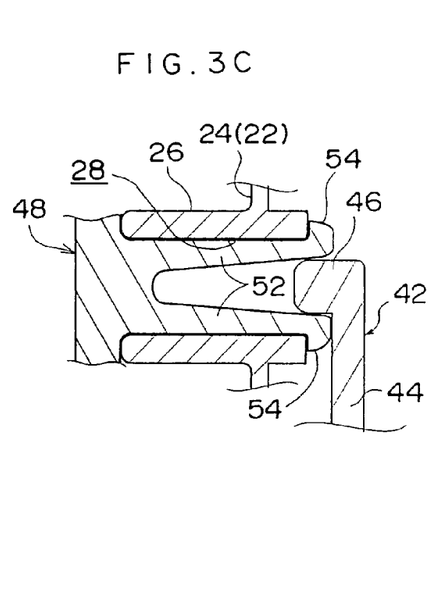

Now, when the link 48 is to be assembled to the case 22, first, with the intruding shaft 34 intruding at the intrusion hole 58 of the link 48, the lower portion of the link 48 is disposed between the guide protrusion 36 and the guide wall 38. Next, as shown in FIG. 3A, the assembly pawls 52 are resiliently deformed to the inner sides thereof and the assembly pawls 52 including the engagement protrusions 54 are inserted into the assembly portion 28. Then the assembly pawls 52 are moved into the assembly portion 28 and, as shown in FIG. 3B, the blocking post 46 of the blocking member 42 is pushed by the assembly pawls 52 and the support plate 44 of the blocking member 42 is resiliently deformed to a side thereof which is opposite to the side thereof at which the assembly pawls 52 are disposed. Thus, the blocking post 46 is separated from the assembly portion 28, and the assembly pawls 52 are moved further into the assembly portion 28. Hence, as shown in FIG. 3C, when the engagement protrusions 54 reach an outer side (the vehicle rightward side) of the assembly portion 28, the assembly pawls 52 are moved to the outer sides thereof by resilient force (restoring force) thereof. Thus, the engagement protrusions 54 are engaged at the assembly portion 28 surrounding area. At this time, the blocking post 46 is moved by resilient force (restoring force) thereof to the side thereof at which the assembly portion 28 is disposed, and the blocking post 46 is inserted between the pair of assembly pawls 52.

As shown in FIG. 4, a first arm 60 is integrally provided at the upper portion of the link 48, in correspondence with the '4' shift position of the shift lever 12. The first arm 60 extends in the vehicle forward direction from the link 48. A receiving surface 60A is provided at the first arm 60. The receiving surface 60A is sloped downward toward the vehicle leftward side. When the shift lever 12 is changed from the 'D' shift position to the '4' shift position and the switching plate 18 is moved in the vehicle leftward direction, the receiving surface 60A is pushed by the switching plate 18, and the first arm 60 is displaced in a vehicle downward direction to a side of a base end of the shift lever 12. As a result, the link 48 is rotated in the direction of arrow A in FIG. 4. At this time, the lower portion of the link 48 slides along the guide protrusion 36, and thus the rotation of the link 48 is guided.

A second arm 62 is integrally provided at the upper portion of the link 48, in correspondence with the 'L' shift position of the shift lever 12. The second arm 62 extends in the vehicle leftward direction from the link 48. A distal end of the second arm 62 is inflected to form an inflected portion 62A. The inflected portion 62A is inclined to the vehicle downward side toward the vehicle leftward side. When the shift lever 12 is changed from the '2' shift position to the 'L' shift position and the switching shaft 20 is moved in the vehicle leftward direction, a lower face of the inflected portion 62A is pushed by the switching shaft 20, and the second arm 62 is displaced in a vehicle upward direction to a side of a distal end of the shift lever 12. As a result, the link 48 is rotated in the direction of arrow A in FIG. 4. At this time, the lower end of the link 48 slides along the guide wall 38, and thus the rotation of the link 48 is guided.

Accordingly, when the shift lever 12 is changed from the 'D' shift position to the '4' shift position and when the shift lever 12 is changed from the '2' shift position to the 'L' shift position, the slider 32 is slid in the vehicle rearward direction in accordance with rotation of the link 48 in the direction of arrow A in FIG. 4. Consequently, it can be detected whether the shift lever 12 is located at the 'D' shift position or '2' shift position, or at the '4' shift position or 'L' shift position. In addition, as has been described above, a pivoting position of the shift lever 12 in the vehicle front-rear direction is detected, and it can be detected which of the 'D' shift position and the '4' shift position, or of the '2' shift position and the 'L' shift position, the shift lever 12 is located at. Thus, this structure detects if the shift lever 12 is located at any one of the 'D' shift position, the '2' shift position, the '4' shift position and the 'L' shift position.

Next, operation of the present embodiment will be described.

In the shift lever apparatus 10 with the structure described above, the link 48 rotates in the direction of arrow A of FIGS. 1 and 4 in accordance with pivoting of the shift lever 12. Consequently, a shift position of the shift lever 12 whether the shift lever 12 is located at the 'D' shift position or the '2' shift position, or at the '4' shift position or the 'L' shift position is detected.

Herein, the assembly pawls 52 of the link 48 are resiliently deformed and inserted at the assembly portion 28 of the case 22, and the engagement protrusions 54 of the assembly pawls 52 are engaged with the surrounding area of the assembly portion 28 by resilient force (restoring force) of the assembly pawls 52. Hence, the link 48 is assembled at the case 22.

Thus, even in a case, as in the present embodiment, of a structure in which the intrusion hole 58 is provided at the link 48, the slider 32 is assembled in the case 22, and the intruding shaft 34 protrudes from the case 22, the intruding shaft 34 may be intruded at the intrusion hole 58 when the link 48 is being assembled to the case 22.

Therefore, the link 48 can be assembled to the case 22 after the slider 32 has been assembled to the case 22 and the case 22 has been constructed (the cover portion 22B has been assembled to the case portion 22A). Thus, the link 48 can be assembled to the case 22 in steps of an assembly process of the shift lever apparatus 10 (a process for assembling the shift lever 12 and the case 22 and the like) that are subsequent to steps for assembly of the case 22. As a result, there are only a number of types of the case 22 and a number of types of the link 48 in the assembly process of the shift lever apparatus 10. Consequently, the number of types of assembly components (the case 22, the link 48 and the like) can be made smaller, and operations for assembly of the shift lever apparatus 10 can be made simpler.

Moreover, when the engagement protrusions 54 are engaged at the surroundings of the assembly portion 28, the blocking post 46 of the blocking member 42 is inserted between the pair of assembly pawls 52, and the blocking post 46 interferes with (abuts against) the assembly pawls 52. Thus, release, due to resilient deformation of the assembly pawls 52, of the engagement of the engagement protrusions 54 with the assembly portion 28 surrounding area can be prevented. Accordingly, the assembly of the link 48 to the case 22 can be prevented from being released.

Further, at the time when the assembly pawls 52 are moved into the assembly portion 28 during assembly of the link 48 to the case 22, the blocking post 46 is pushed by the assembly pawls 52, the support plate 44 of the blocking member 42 is resiliently deformed to the side thereof that is opposite to the side thereof at which the assembly pawls 52 are disposed, and the blocking post 46 is separated from the assembly portion 28. Consequently, engagement of the engagement protrusions 54 at the assembly portion 28 surrounding area is enabled. Thus, obstruction by the blocking post 46 of the engagement of the engagement protrusions 54 at the assembly portion 28 surrounding area can be prevented, the engagement protrusions 54 can easily be engaged at the assembly portion 28 surrounding area, and the link 48 can be easily assembled to the case 22.

Note that although the structure of the present embodiment is provided with a pair of the assembly pawls 52, the structure may be provided with one assembly pawl, or with three or more assembly pawls.

Further, although the present embodiment has a structure in which the assembly portion 28 is provided at the case 22 and the assembly pawls 52 are provided at the link 48, structures in which assembly pawls are provided at a case (assembly member) and an assembly portion is provided at a link (rotating member) are also possible.

Further again, the present embodiment has a structure in which it is detected whether the shift lever 12 is positioned at one of the 'D' shift position and the '2' shift position or at one of the '4' shift position and the 'L' shift position by the rotation of the link 48. However, structures which detect, by rotation of a link (rotating member), if a shift lever is located at other shift positions are also possible.

Further still, the present embodiment has a structure in which the shift lever apparatus 10 is a gate-type apparatus in which the shift lever 12 is pivoted in the vehicle front-rear direction and the vehicle left-right direction. However, structures in which a shift lever apparatus is a straight-type apparatus in which a shift lever is pivoted only in a predetermined direction are also possible. The predetermined direction may be a vehicle front-rear direction.

Further yet, the present embodiment has a structure in which the shift lever apparatus 10 is disposed at a floor surface inside a vehicle. However, structures in which a shift lever apparatus is disposed at an instrument panel, a steering column or the like in a vehicle are also possible.

In the shift lever apparatus of the present invention, an assembly pawl is resiliently deformed and inserted at an assembly portion, and an engagement protrusion of the assembly pawl is engaged with surroundings of the assembly portion by a resilient force of the assembly pawl. Thus, an assembly member is assembled to a rotating member. As a result, the rotating member can be assembled to the assembly member in a step of an assembly process of the shift lever apparatus subsequent to a step for assembling the assembly member. Consequently, a number of types of the assembly member in the assembly process of the shift lever apparatus can be made smaller. Further, assembly operations of the shift lever apparatus can be made simpler.

In a case in which the shift lever apparatus of the present invention is further provided with a blocking member, the blocking member interferes with the assembly pawl when the engaging protrusion is engaged at the surroundings of the assembly portion, and release of the engagement of the engaging protrusion at the assembly portion surroundings is obstructed. Consequently, release of the assembly of the rotating member to the assembly member can be prevented.

In the shift lever apparatus in a case in which this blocking member has resilience, the blocking member is resiliently deformed, by the assembly pawl, toward a side thereof which is opposite to a side thereof at which the assembly pawl is disposed. Engagement of the engaging protrusion at the assembly portion surrounding area is accordingly enabled. Thus, the rotating member can be assembled to the assembly member with ease.

What is claimed is:

1. A shift lever apparatus comprising:
   a shift lever, a shift position of which is changed by moving;
   an assembly member disposed at a vicinity of the shift lever;
   a rotating member which is rotatably assembled to the assembly member and which detects the shift position of the shift lever by rotating in accordance with pivoting of the shift lever;
   an assembly portion provided at one of the assembly member and the rotating member;
   at least one assembly pawl provided at the other of the assembly member and the rotating member, the assembly pawl including resilience, the assembly pawl including an engaging protrusion which protrudes to an outer side, and the assembly pawl being inserted at the assembly portion and the engaging protrusion engaging at a surrounding area of the assembly portion for assembling the rotating member to the assembly member and a blocking member disposed in correspondence with the assembly pawl, the blocking member being pre-positioned to interfere with the assembly pawl when the engaging protrusion is first engaged at the surrounding area of the assembly portion, for blocking release of the engagement of the engaging protrusion at the assembly portion surrounding area.

2. The shift lever apparatus of claim 1, wherein the blocking member comprises resilience, the blocking member being resiliently deformable by the assembly pawl to a side of separating from the assembly pawl such that the engaging protrusion can be engaged at the assembly portion surrounding area.

3. The shift lever apparatus of claim 1, wherein the assembly member comprises a box-like case, the case including a triangular plate-form protruding place at one side of the case, the protruding plate including an insertion tube, and the insertion tube including the assembly portion.

4. The shift lever apparatus of claim 3, wherein the blocking member is provided at the case, the blocking member includes a long flat plate-form support plate including resilience and a non-resilient cylinder-form blocking post, one end of the support plate is disposed in the case so as to be fixed to the case, another end of the support plate protrudes upward from the case, and the blocking post is integrally provided at an upper end of the support plate, protruding from the support plate and disposed on a central axis of the assembly portion.

5. The shift lever apparatus of claim 3, wherein the rotating member comprises a long plate-form link, the link including a fitting tube which is integrally provided at an upper portion of the link, an outer peripheral face of the insertion tube being fittable with an inner peripheral face of the fitting tube.

6. The shift lever apparatus of claim 5, wherein a face of one side of the fitting tube abuts against the protruding plate, and a face of one side of the insertion tube abuts against a side face of the link inside the fitting tube.

7. The shift lever apparatus of claim 5, wherein two of the assembly pawl are provided, the assembly pawls being disposed at a central vicinity of the fitting tube so as to oppose one another and sandwich a center of the intrusion tube.

8. The shift lever apparatus of claim 7, wherein the assembly pawls are respectively inserted into the assembly portion, respective outer peripheral surfaces of the assembly pawls including circular periphery surface forms and fitting with a peripheral surface of the assembly portion.

9. The shift lever apparatus of claim 8, wherein the blocking post of the blocking member is insertable between the pair of assembly pawls, the blocking post abuts against each of the assembly pawls for blocking resilient deformation of the assembly pawls to inner sides thereof and is capable of blocking release of the engagement of the engaging protrusion at the surrounding area of the assembly portion, and the support plate of the support member is capable of abutting against one of the engaging protrusions.

10. A shift lever apparatus comprising:
   a shift lever, a shift position of which is changed by pivoting;
   an assembly member disposed at a vicinity of the shift lever;
   a rotating member which is rotatably assembled to the assembly member and which detects the shift position of the shift lever by rotating in accordance with pivoting of the shift lever;
   an assembly portion provided at the rotating member;
   at least one assembly pawl provided at the assembly member, the assembly pawl including resilience, the assembly pawl including an engaging protrusion which protrudes to an outer side, and the assembly pawl being inserted at the assembly portion and the engaging protrusion engaging at a surrounding area of the assembly portion for assembling the rotating member to the assembly member and a blocking member disposed in correspondence with the assembly pawl, the blocking member being pre-positioned to interfere with the assembly pawl when the engaging protrusion is first engaged at the surrounding area of the assembly portion, for blocking release of the engagement of the engaging protrusion at the assembly portion surrounding area.

11. The shift lever apparatus of claim 10, wherein the blocking member comprises resilience and enables engagement of the engaging protrusion at the assembly portion surrounding area by being resiliently deformed by the assembly pawl to a side of the blocking member which is opposite to a side thereof at which the assembly pawl is disposed.

* * * * *